(12) United States Patent
Oravecz

(10) Patent No.: US 10,173,745 B1
(45) Date of Patent: Jan. 8, 2019

(54) MECHANISM FOR SECURING A PAYLOAD IN A DESIRED ANGULAR ORIENTATION

(71) Applicant: Paul Oravecz, Los Angeles, CA (US)

(72) Inventor: Paul Oravecz, Los Angeles, CA (US)

( * ) Notice: Subject to any disclaimer, the term of this patent is extended or adjusted under 35 U.S.C. 154(b) by 264 days.

(21) Appl. No.: 15/216,098

(22) Filed: Jul. 21, 2016

(51) Int. Cl.
*B62K 21/16* (2006.01)
*F16H 1/16* (2006.01)
*B62K 11/14* (2006.01)

(52) U.S. Cl.
CPC .............. *B62K 21/16* (2013.01); *B62K 11/14* (2013.01); *F16H 1/16* (2013.01)

(58) Field of Classification Search
CPC ...... B62K 11/14; B62K 21/10; B62K 21/125; B62K 21/16; B62K 23/00; B63H 2025/026; F16H 1/16; F16H 1/166; F16H 19/04; F16H 21/44
See application file for complete search history.

(56) References Cited

U.S. PATENT DOCUMENTS

| | | | | |
|---|---|---|---|---|
| 575,266 | A * | 1/1897 | McCollum | B62K 21/16 74/551.5 |
| 2,438,657 | A * | 3/1948 | Dufaux | B62K 21/16 74/551.5 |
| 4,023,436 | A * | 5/1977 | Dodge | B62K 21/16 74/551.3 |
| 4,682,509 | A * | 7/1987 | Takamiya | B62K 21/16 403/97 |
| 5,323,664 | A * | 6/1994 | Fairfield | B62K 21/16 74/551.1 |
| 5,409,321 | A * | 4/1995 | Chen | B25B 5/08 403/321 |

(Continued)

FOREIGN PATENT DOCUMENTS

| | | | | |
|---|---|---|---|---|
| DE | 9314559 U1 | * | 2/1994 | ............. B62K 21/16 |
| DE | 202010009227 U1 | * | 10/2011 | ............. B62K 21/16 |
| GB | 1571841 A | * | 7/1980 | ............. B62K 21/16 |

*Primary Examiner* — Adam D Rogers
(74) *Attorney, Agent, or Firm* — William J. Benman; Benman, Brown & Williams

(57) ABSTRACT

A mechanism for securing a payload in a desired angular orientation. The mechanism includes a gear; a spline shaft coaxially mounted to engage the gear in a first position on a longitudinal axis of the shaft and to disengage the gear in a second position of the longitudinal axis of the shaft, the gear or the shaft being coupled to the payload whereby an angular orientation of the payload may be changed from a first angle to a second angle when the gear is in the second position; and a spring assembly mechanically coupled to the gear and spline shaft to restore the shaft to the first position from the second position. The gear and the shaft have matching and interlocking male/female splines. The spline shaft is capped at a proximal end thereof. The cap is substantially transverse to the longitudinal axis of the shaft and having an aperture therein at the center thereof. The spring assembly includes a bolt mounted for reciprocal movement in the shaft along the longitudinal axis thereof, the bold having a bolt head at a distal end thereof and being secured to the gear at a proximal end of the bolt. The spring assembly further includes a spring mounted between the bold head and the cap. In the illustrative embodiment, the mechanism is implemented in an adjustable handlebar assembly.

14 Claims, 9 Drawing Sheets

(56) References Cited

U.S. PATENT DOCUMENTS

| | | | | |
|---|---|---|---|---|
| 9,038,500 | B1* | 5/2015 | Oravecz | B62K 21/16 74/551.3 |
| 9,272,748 | B1* | 3/2016 | Oravecz | B62K 21/16 |
| 9,708,024 | B2* | 7/2017 | Oravecz | B62K 11/14 |
| 2003/0084746 | A1* | 5/2003 | Cutsforth | B62K 21/12 74/551.8 |
| 2012/0125145 | A1* | 5/2012 | Vanderveen | B62H 5/04 74/551.8 |
| 2017/0259873 | A1* | 9/2017 | Sotir | G05G 5/06 |

* cited by examiner

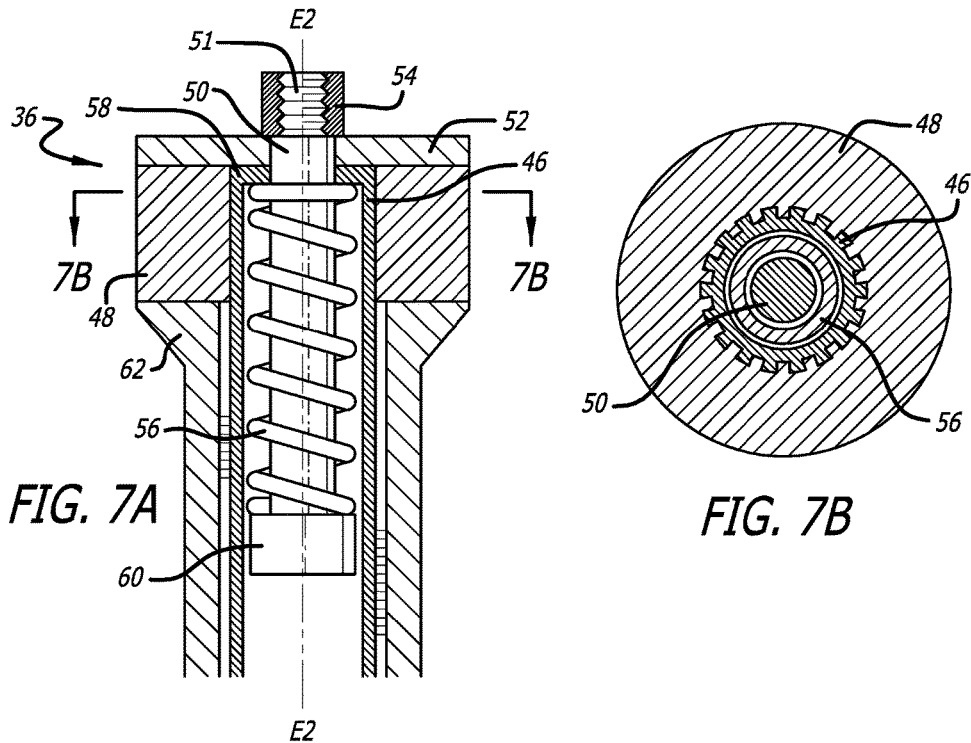
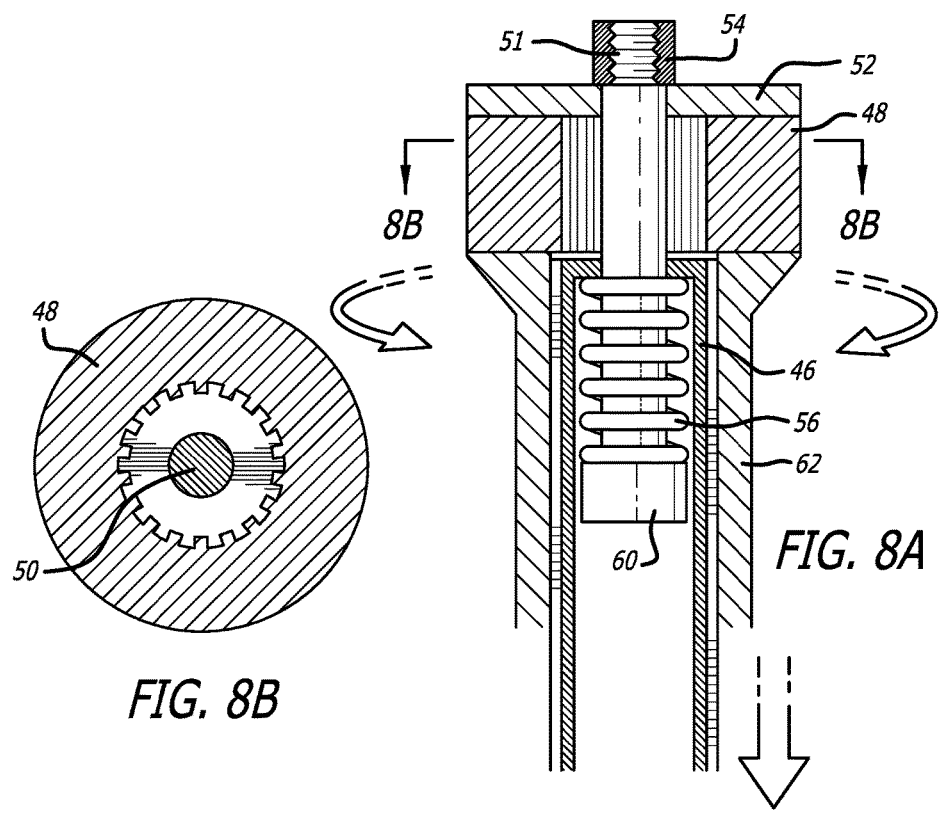

MECHANISM FOR SECURING A PAYLOAD IN A DESIRED ANGULAR ORIENTATION

BACKGROUND OF THE INVENTION

Field of the Invention

The present invention relates to mechanical systems. More specifically, the present invention relates to systems and methods for mechanisms and methods for manually securing the angular orientation of payloads.

Description of the Related Art

For a variety of applications, there was a need for a mechanism for inducing rotational as well as translational motion. For example, it is well-known in the motorcycle community that the typically fixed position of the handlebars has numerous limitations including: 1) a suboptimal positioning of the handlebars for a rider; 2) even if optimal at one time, the fixed handlebar position can be uncomfortable for a rider on another occasion due to injury, illness, weight gain or a variety of other changes in the riders condition or mood; and/or 3) the position of the handlebars, even if comfortable at the start of a ride, can become uncomfortable over time after long hours on the road.

Accordingly, a need existed in the art for an apparatus and method for adjusting the position of handlebars for motorcycles and other similar vehicles. While adjustable handlebars were known in the art, these systems typically required the user to adjust the handlebar positions mechanically and by hand. This was slow, cumbersome and typically provided a discrete set of position options as opposed to a continuous set of position options. Hence, a need remained in the art for an easy to use motorized system and method for adjusting motorcycle handle bars over a continuous range of motion.

The need was addressed by an invention disclosed by the present applicant in U.S. Pat. No. 9,038,500 entitled SYSTEM AND METHOD FOR CONTINUOUSLY VARIABLE MOTORIZED ADJUSTMENT OF MOTORCYCLE HANDLEBARS, issued May 28, 2015, the teachings of which are incorporated herein by reference. This patent discloses and claims a motorized system for adjusting the tilt angle and telescopic position of handlebars mounted on a motorcycle, bicycle or other vehicle.

While this invention substantially addresses the need in the art, unfortunately, it required two motors. This adds to the cost and weight of the arrangement. Hence, a need remained for a system for a system for adjusting the rider's position while still controlling the motorcycle (i.e., throttle, brake, clutch, etc.) and allowing for use of the original handlebars with a single motor. More generally, a need remained in the art for a system and method for inducing rotational as well as translational motion of a mechanism with a single motor.

This need was addressed by present applicant in U.S. Pat. No. 9,272,748 entitled MECHANISM FOR EFFECTING TRANSLATIONAL AND ROTATIONAL MOTION, issued Mar. 1, 2016, the teachings of which are incorporated herein by reference. This patent disclosed and claimed a system for adjusting the rider's position while still controlling the motorcycle (i.e., throttle, brake, clutch, etc.) and allowed for use of the original handlebars with a single motor. While this patent disclosed and claimed a system and method for inducing rotational as well as translational motion of a mechanism with a single motor, it offered only limited range of motion with respect to the position of handle bar grips per se.

Hence, a need remains in the art for a system or method for adjusting the position of handlebar grips per se. A further need remains for a system or method for adjusting the position of handlebar grips that did not require a wrench or other tool. This would enable a rider to make adjustments anywhere without need for a tool.

SUMMARY OF THE INVENTION

The need in the art is addressed by the mechanism for securing a payload in a desired angular orientation of the present invention. The invention includes a gear; a spline shaft coaxially mounted to engage the gear in a first position on a longitudinal axis of the shaft and to disengage the gear in a second position of the longitudinal axis of the shaft, the gear or the shaft being coupled to the payload whereby an angular orientation of the payload may be changed from a first angle to a second angle when the gear is in the second position; and a spring assembly mechanically coupled to the gear and spline shaft to restore the shaft to the first position from the second position.

The gear and the shaft have matching and interlocking male/female splines. The spline shaft is capped at a proximal end thereof. The cap is substantially transverse to the longitudinal axis of the shaft and having an aperture therein at the center thereof. The spring assembly includes a bolt mounted for reciprocal movement in the shaft along the longitudinal axis thereof, the bold having a bolt head at a distal end thereof and being secured to the gear at a proximal end of the bolt. The spring assembly further includes a spring mounted between the bold head and the cap.

The inventive mechanism may be implemented in a novel adjustable handlebar assembly comprising: a first mechanism for effecting rotation of first and second handlebar assemblies about a first axis; a second and third mechanism for effecting translation of the first and second handlebar assemblies along second and third axes respectively; fourth and fifth mechanisms for selecting an angular orientation of the first and second handlebar assemblies relative to the first axis and locking the handlebar assemblies in a selected angular orientation, the fourth and fifth mechanisms each including: a gear; a spline shaft coaxially mounted to engage the gear in a first position on a longitudinal axis of the shaft and to disengage the gear in a second position of the longitudinal axis of the shaft, the gear or the shaft being coupled to the payload whereby an angular orientation of the payload may be changed from a first angle to a second angle when the gear is in the second position; and a spring assembly mechanically coupled to the gear and spline shaft to restore the shaft to the first position from the second position. The first mechanism is a motor. The second and third mechanisms include first and second worm gears respectively and first and second bar angle control mechanisms between the motor and the worm first and second gears respectively.

Each of the bar angle control mechanisms includes: a gear; a spline shaft coaxially mounted to engage the gear in a first position on a longitudinal axis of the shaft and to disengage the gear in a second position of the longitudinal axis of the shaft, the gear or the shaft being coupled to the payload whereby an angular orientation of the payload may be changed from a first angle to a second angle when the gear is in the second position; and a spring assembly mechanically coupled to the gear and spline shaft to restore the shaft to the first position from the second position.

The handlebar assembly further includes first and second handles coupled to the second and third mechanisms respectively, each of the second and third mechanisms including a first handle angle control mechanism coupled to the handle. The first handle angle control mechanism includes a gear; a spline shaft coaxially mounted to engage the gear in a first position on a longitudinal axis of the shaft and to disengage the gear in a second position of the longitudinal axis of the shaft, the gear or the shaft being coupled to the payload whereby an angular orientation of the payload may be changed from a first angle to a second angle when the gear is in the second position; and a spring assembly mechanically coupled to the gear and spline shaft to restore the shaft to the first position from the second position.

Each of the second and third mechanisms further include a second handle angle control mechanism coupled to the handle, the second handle angle control mechanism including: a gear; a spline shaft coaxially mounted to engage the gear in a first position on a longitudinal axis of the shaft and to disengage the gear in a second position of the longitudinal axis of the shaft, the gear or the shaft being coupled to the payload whereby an angular orientation of the payload may be changed from a first angle to a second angle when the gear is in the second position; and a spring assembly mechanically coupled to the gear and spline shaft to restore the shaft to the first position from the second position.

BRIEF DESCRIPTION OF THE DRAWINGS

FIG. 7A is a sectional side view of the top half of the 'pull and twist' embodiment of the joint 36.

FIG. 7B is a sectional top view of the 'pull and twist' embodiment of the sixth joint depicted in FIG. 7A.

FIG. 8A is a sectional side view of the top half of the 'pull and twist' embodiment of the sixth joint 36 with the spring thereof compressed and the spline gear therein in a second (disengaged) position at which relative rotational motion is enabled between the male and female splines.

FIG. 8B is a sectional top view of the joint depicted in FIG. 8A.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
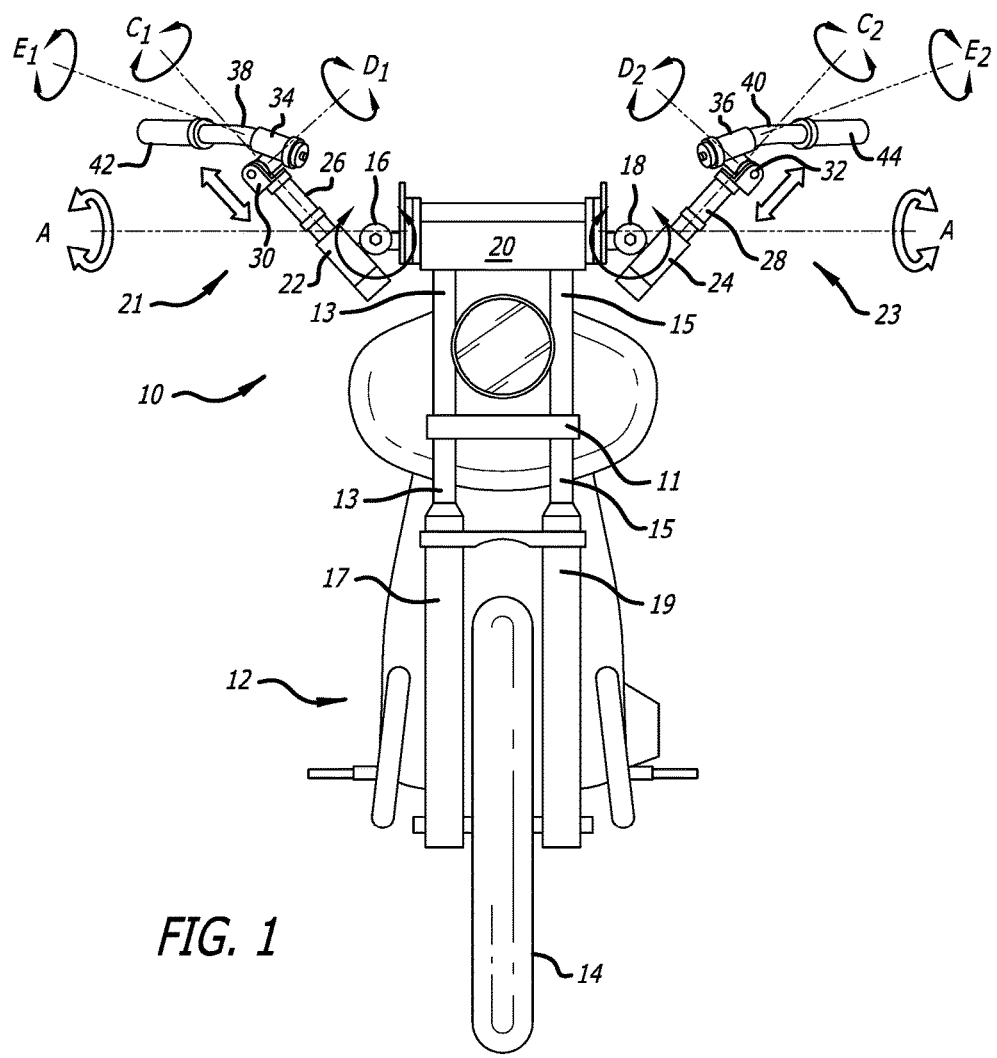
FIG. 1 is a front view of a motorcycle equipped with an illustrative embodiment of the system for adjusting the position of handlebar grips of the present invention in a first position.

FIG. 1 is a front view of a motorcycle equipped with an illustrative embodiment of the system for adjusting the position of handlebar grips of the present invention in a first position. As shown in FIG. 1, the motorcycle 10 has a fork 12 at which a wheel 14 is mounted. First and second prongs 13 and 15 engage first and second shock absorbers 17 and 19. In accordance with the present teachings, a motor 20 rests on two struts 13 and 15 that are coupled to a respective prong 17 and 19 of the fork 12 of the motorcycle 10. The struts are coupled to each other via a headstock 11. In the best mode, the motor 20 is of conventional design. A suitable drive motor 20 may be purchased from Suzhou Chuangtou Machinery and Electrical Technology Co. Ltd. and other manufacturers. The motor 20 is mounted transverse to the longitudinal axis of the forks 20.

A particularly novel aspect of the present invention is the provision of manually reconfigurable first and second handlebar assemblies 21 and 23. The first and second handlebar assemblies are mirror images of each other. Hence, any detailed discussion with respect to one handlebar assembly should be taken as applying to the other assembly as well.

The motor 20 rotates the handlebar assemblies 21 and 23 about the longitudinal axis A-A of the motor 20. This provides a first degree of freedom of motion of the handlebar assemblies 21 and 23. The handlebar assemblies 21 and 23 constitute a payload.

The first and second handlebar assemblies are coupled to the rotor (not shown) of the motor 20 at first and second manually reconfigurable joints 16 and 18. The first and second manually reconfigurable joints, 16 and 18 respectively, provide bar angle control about axes $B_1$ and $B_2$ as best illustrated in the top view of FIG. 3. This provides a second degree of freedom of motion for the handlebar assemblies 21 and 23.

As discussed more fully below, the manually reconfigurable joints allow for a user to quickly and easily effect a change in the mounting angle of the assembly and then trust that the assembly is secure. This is achieved by a novel 'pull and twist', a novel 'push and twist' or a conventional quick release clamp as discussed more fully below.

Each handlebar assembly includes a worm gear 22, 24, a handlebar 38, 40 and two manually reconfigurable joints 30, 34 and 32, 36 there between respectively. That is, the first worm gear 22 in FIG. 1 extends and retracts a first riser 26 along longitudinal axis $C_1$ therethrough in response to an electrical signal from a source (not shown) when activated by a control mechanism (not shown). (For more detail on the design and operation of the worm gears, power source and control mechanism, see the above-referenced U.S. Pat. Nos. 9,038,500 and 9,272,748, the teachings of which have been incorporated herein by reference.)

The proximal end of the riser 26 is coupled to the worm gear 22. The distal end of the riser 26 is coupled to a third manually reconfigurable joint 30. This joint enables manual control of the angular orientation of the first handlebar 38 with respect to a longitudinal axis $D_1$ therethrough via a fourth manually reconfigurable joint 34 physically coupled, i.e. welded, thereto.

The fourth manually reconfigurable joint 34 enables manual control of the angular orientation of the first handlebar 38 about a longitudinal axis $E_1$ extending through the joint 34. A proximal end of the first handlebar 38 is secured within to the fourth reconfigurable joint 34 and a first handlebar grip 42 is mounted on the distal end of the first handlebar 38. Note that, in the illustrative embodiment of FIG. 1, the first handlebar 38 is mounted in the fourth joint 34 at an angle. Hence, rotation of the first handlebar 38 via the fourth joint 34 effects a change in the angular orientation of the first grip 42 (the driver's right hand grip) relative to the fourth joint 34.

Similarly, the second worm gear 24 in FIG. 1 extends and retracts a second riser 28 along longitudinal axis $C_2$ therethrough in response to an electrical signal from a source (not shown) when activated by a control mechanism (not shown).

The proximal end of the second riser 28 is coupled to the second worm gear 24. The distal end of the second riser 28 is coupled to a fifth manually reconfigurable joint 32. This joint enables manual control of the angular orientation of the second handlebar 40 with respect to a longitudinal axis $D_2$ therethrough via a sixth manually reconfigurable joint 36 physically coupled, i.e. welded, thereto.

The sixth manually reconfigurable joint 36 enables manual control of the angular orientation of the second handlebar 40 about a longitudinal axis $E_2$ extending through the joint 36. A proximal end of the second handlebar 40 is secured within to the sixth reconfigurable joint 36 and a second handlebar grip 44 is mounted on the distal end of the second handlebar 40. Again, note that, in the illustrative embodiment of FIG. 1, the second handlebar 40 is mounted in the sixth joint 36 at an angle. Hence, rotation of the second handlebar 40 via the sixth joint 36 effects a change in the angular orientation of the second grip 44 (the driver's left hand grip) relative to the sixth joint 36.

Figure 2:
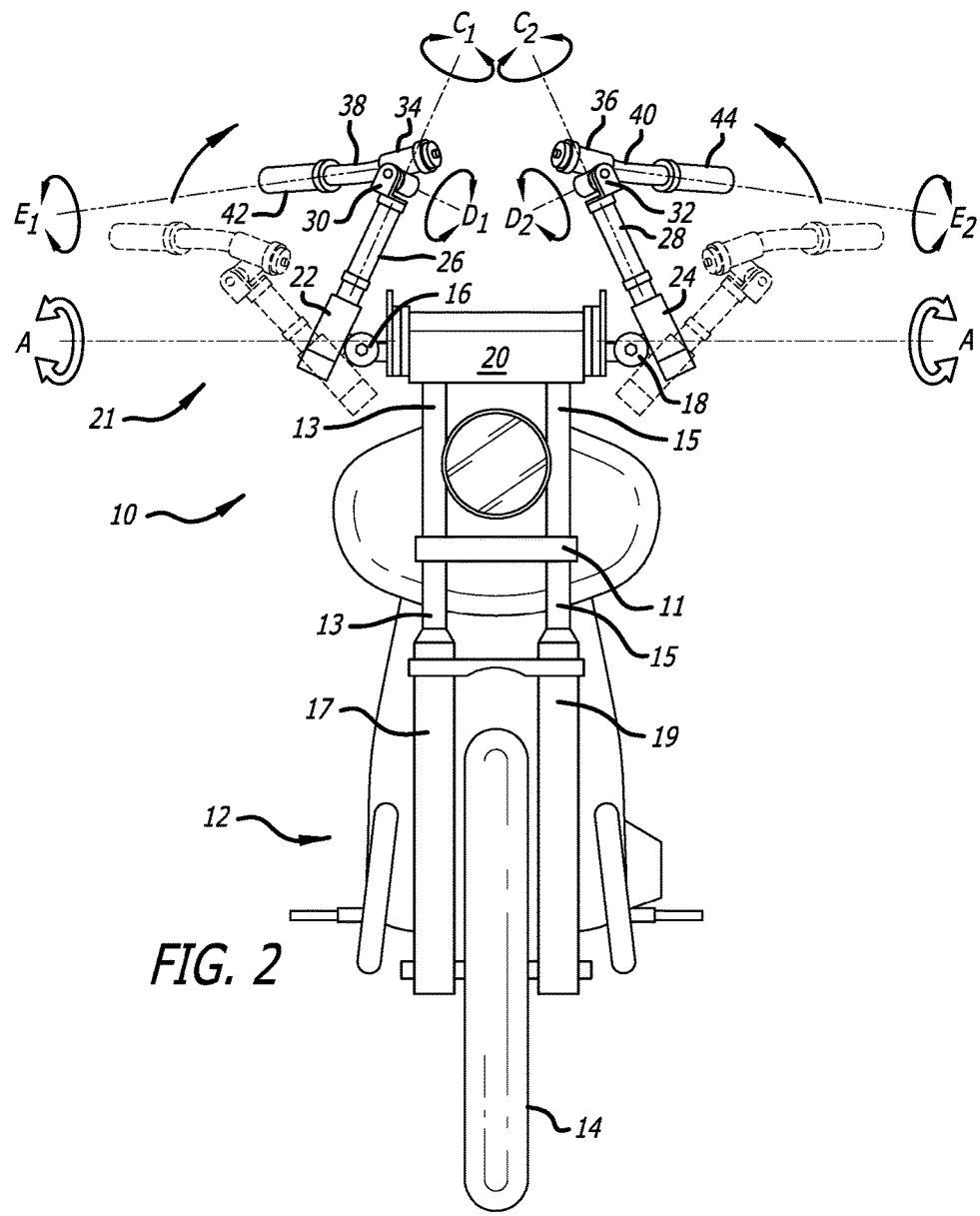
FIG. 2 is a front view of the motorcycle of FIG. 1 showing the handlebar assemblies of system of the present invention an illustrative configuration at a second angular position about the axes $B_1$ and $B_2$, $D_1$ and $D_2$ and $E_1$ and $E_2$ in accordance with the present teachings.
Figure 3:
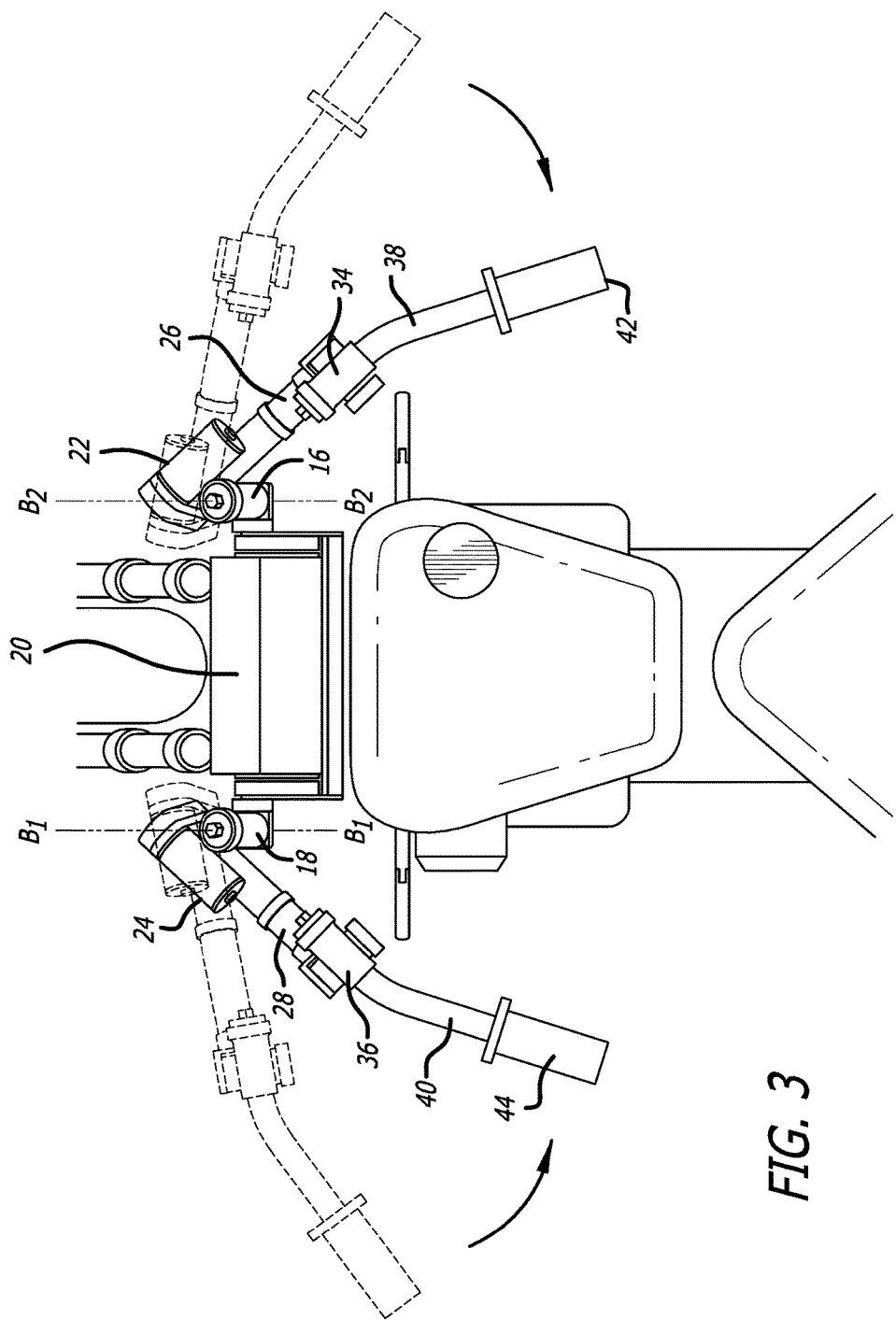
FIG. 3 is a top front partial view of the motorcycle of FIG. 1 showing the handlebar assemblies of system of the present invention an illustrative third configuration at a second angular position about the axes A-A, $B_1$ and $B_2$, in accordance with the present teachings.
Figure 4:
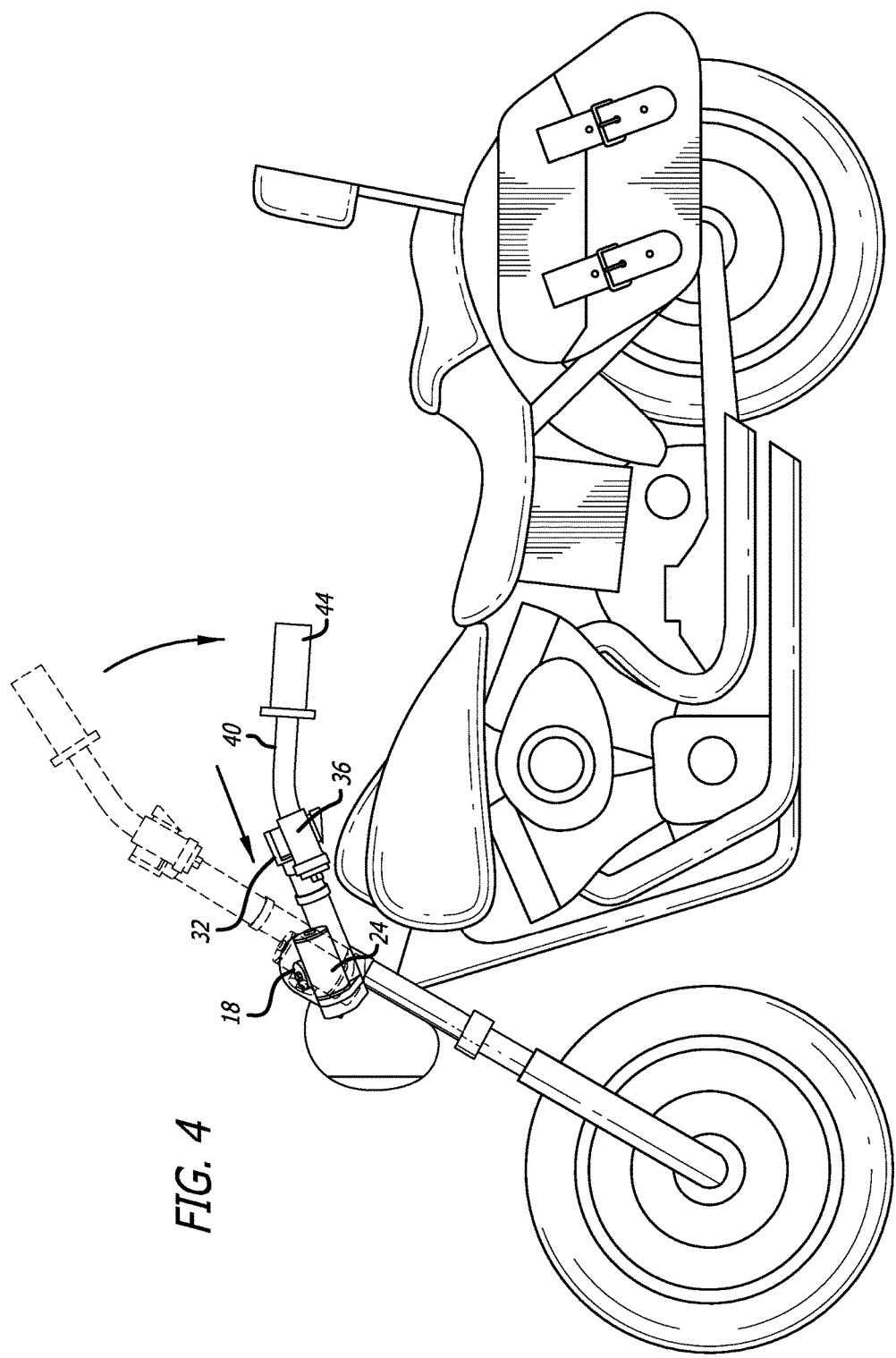
FIG. 4 is a side view of the motorcycle of FIG. 1 showing the handlebar assemblies of system of the present invention an illustrative fourth configuration at a third angular position about the axis A-A in accordance with the present teachings.

FIGS. 2-4 illustrate the configuration options enabled by the system for adjusting the position of handlebar grips of the present invention.

FIG. 2 is a front view of the motorcycle of FIG. 1 showing the handlebar assemblies of system of the present invention an illustrative configuration at a second angular position about the axes $B_1$ and $B_2$, $D_1$ and $D_2$ and $E_1$ and $E_2$ in accordance with the present teachings.

FIG. 3 is a top front partial view of the motorcycle of FIG. 1 showing the handlebar assemblies of system of the present invention an illustrative third configuration at a second angular position about the axes A-A, $B_1$ and $B_2$, in accordance with the present teachings.

FIG. 4 is a side view of the motorcycle of FIG. 1 showing the handlebar assemblies of system of the present invention an illustrative fourth configuration at a third angular position about the axis A-A in accordance with the present teachings.

Figure 5:
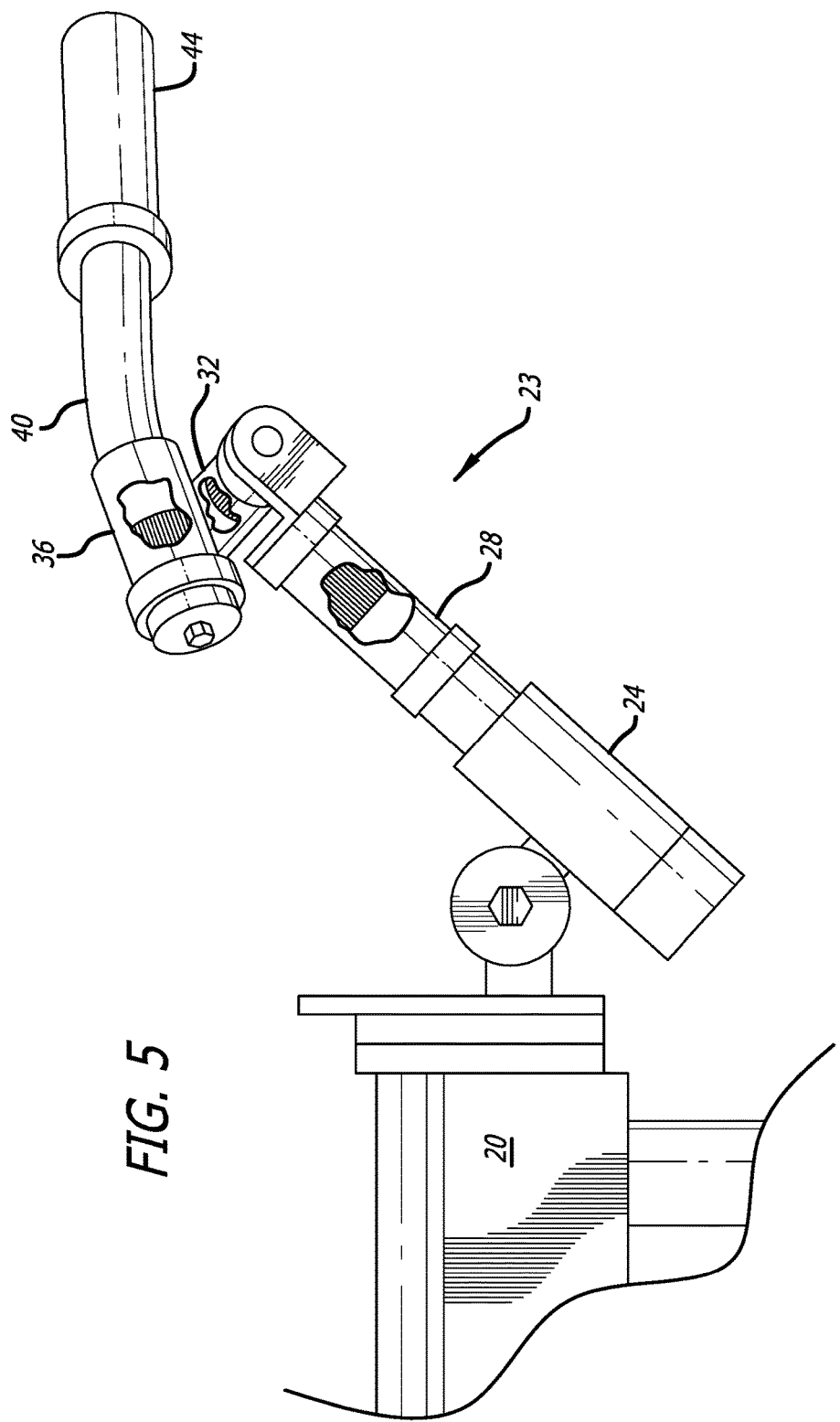
FIG. 5 is a magnified view of a portion of the second (left side) handlebar assembly of FIG. 1, with the second riser, fifth joint and sixth joint partially fragmented to reveal the inner construction thereof.

FIG. 5 is a magnified view of a portion of the second (left side) handlebar assembly 23 of FIG. 1, with the second riser 28, fifth joint 32 and sixth joint 36 partially fragmented to reveal the inner construction thereof.

Figure 6:
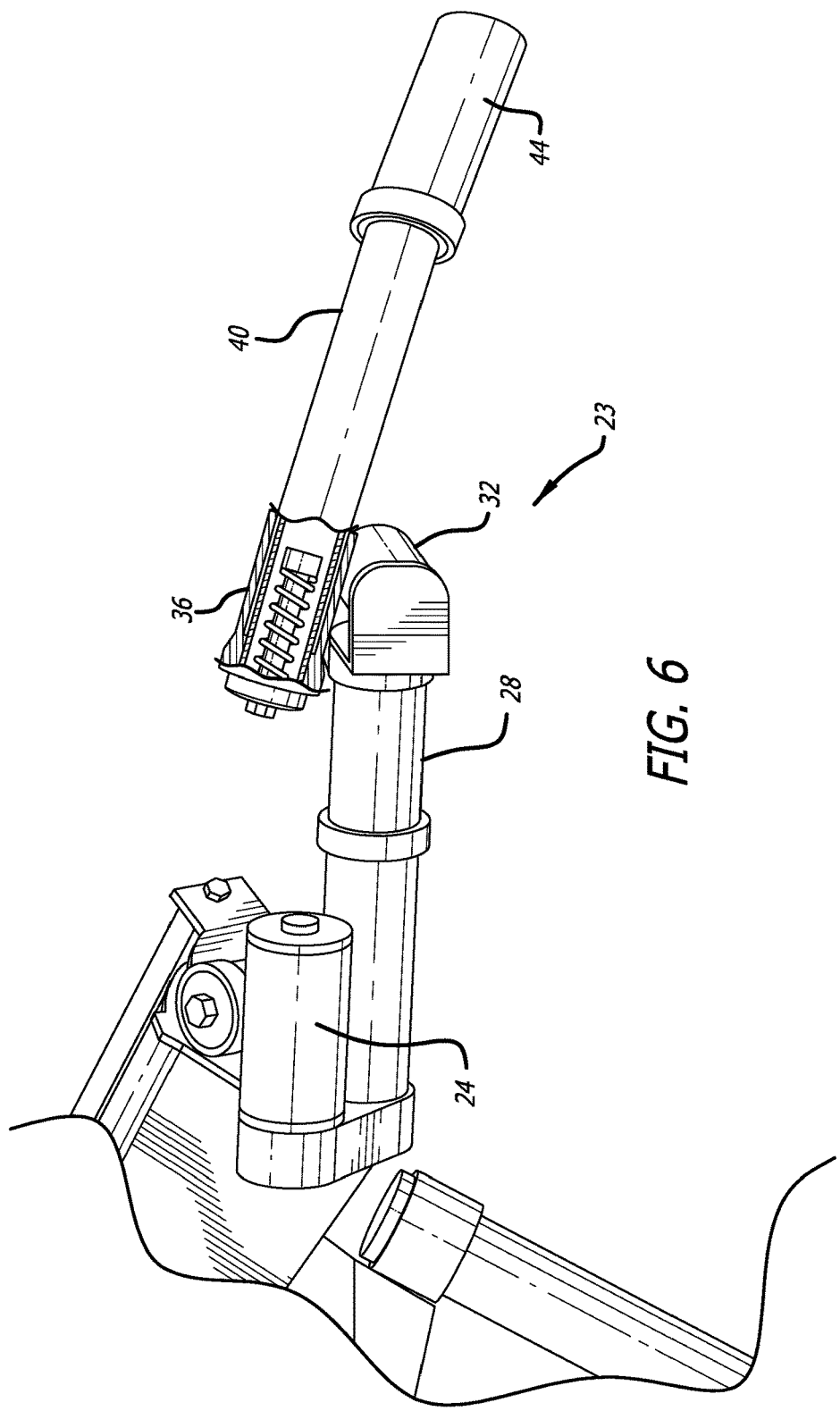
FIG. 6 is a magnified view of a portion of the second (left side) handlebar assembly of FIG. 5, with an illustrative 'pull and twist' embodiment of the sixth joint shown in a sectional view to reveal the inner construction thereof.

FIG. 6 is a magnified view of a portion of the second (left side) handlebar assembly 23 of FIG. 5, with an illustrative 'pull and twist' embodiment of the sixth joint 36 shown in a sectional view to reveal the inner construction thereof. It should be understood that all of the 'pull and twist' type manually reconfigurable joints are of the same construction as the sixth joint, hence only the sixth joint will be described in detail herein.

FIGS. 7A-9 are sectional views showing the 'pull and twist' embodiment of the manually reconfigurable joint of the present invention in detail.

FIG. 7A is a sectional side view of the top half of the 'pull and twist' embodiment of the joint 36.

FIG. 7B is a sectional top view of the 'pull and twist' embodiment of the sixth joint depicted in FIG. 7A.

FIG. 8A is a sectional side view of the top half of the 'pull and twist' embodiment of the sixth joint 36 with the spring thereof compressed and the spline gear therein in a second (disengaged) position at which relative rotational motion is enabled between the male and female splines.

FIG. 8B is a sectional top view of the joint depicted in FIG. 8A.

Figure 9:
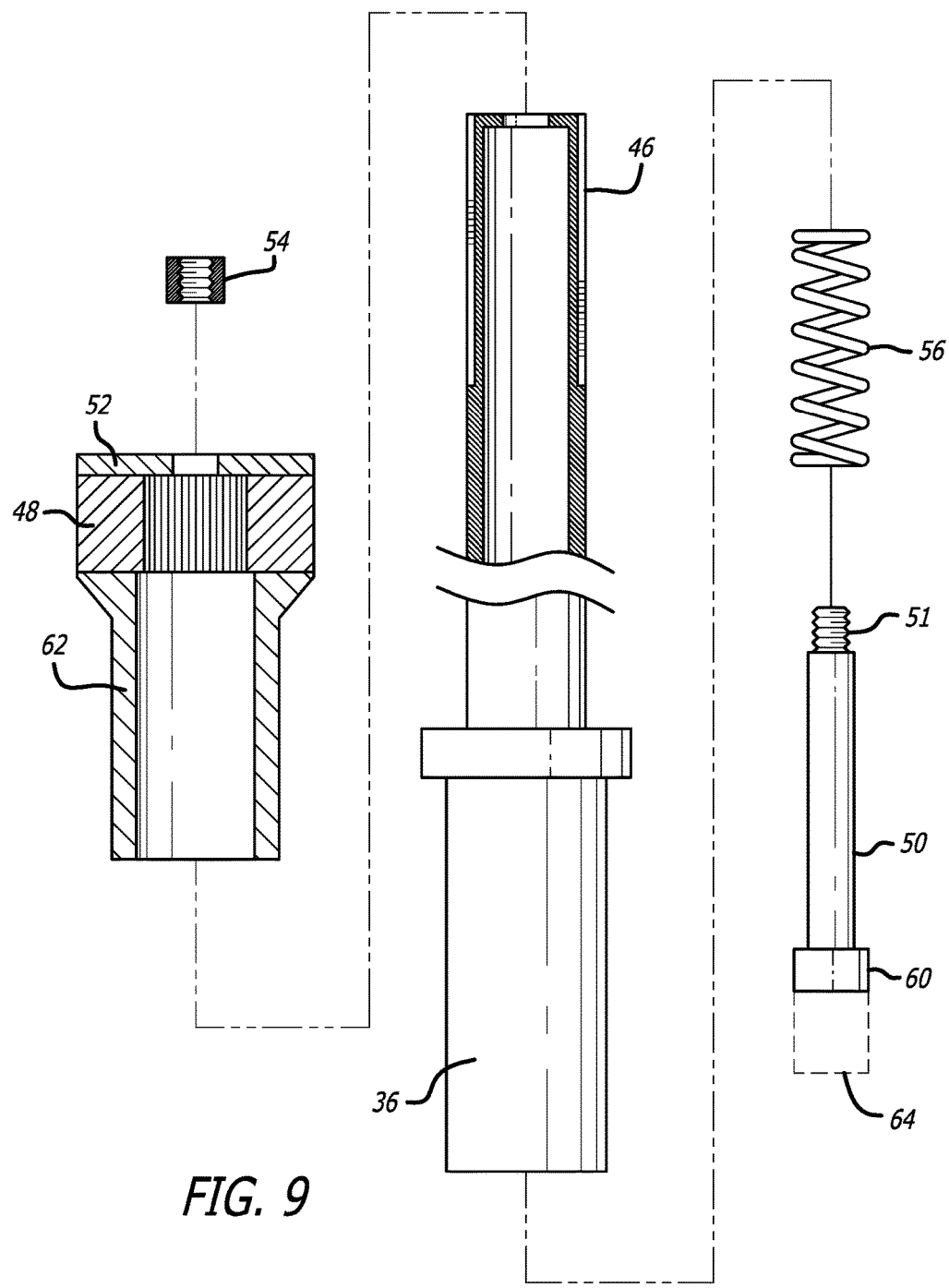
FIG. 9 is a side elevational view of the pull and twist embodiment of the manually reconfigurable joints of the present invention partially in section.

FIG. 9 is a side elevational view of the pull and twist embodiment of the manually reconfigurable joints of the present invention partially in section.

As illustrated in FIGS. 7A-9, with the 'pull and twist' implementation of the manually reconfigurable joints of the present invention, the joints are essentially gears with a male spline mounted on a shaft 46 and a female spline gear 48 with a 1:1 ratio there between. A bolt 50 extends through the male spline shaft 46, female spline gear 54, and washer 52 and is secured to the assembly 36 by a nut 54 at a distal threaded end 51 thereof. A spring 56 is mounted within the male spline shaft 46 between a transverse end cap 58 of the male spline shaft 46 and the head 60 of the bolt 50 at the proximal end thereof.

In operation, as illustrated in FIG. 7A, when the spring 56 is fully extended, the male and female splines are in a first (fully engaged) position. To change the angular orientation of the joint, the user pulls the shaft 62 below the female gear 48 and causes the female gear 48 to translate along the longitudinal axis $E_2$ to a second (fully disengaged) position as shown in FIG. 8A. In this second position, the female spline may be rotated to a second angular position relative to the male shaft (fixed to the structure of the motorcycle). When the female gear is released, the spring 56 causes it to securely seat in the second desired angular orientation with the male spline. Hence, structure attached to the female gear is rotated from a first angular position to a second angular position relative to any structure attached to the male spline shaft and secured in place using a simple manual 'pull and twist' movement in accordance with the present teachings.

It should be noted that the manually reconfigurable joints 16, 18, 30 and 32 may be implemented as 'push and twist' joints with the simple extension 64 of the end of the bolt head 60 as illustrated in FIG. 9.

Figure 10:
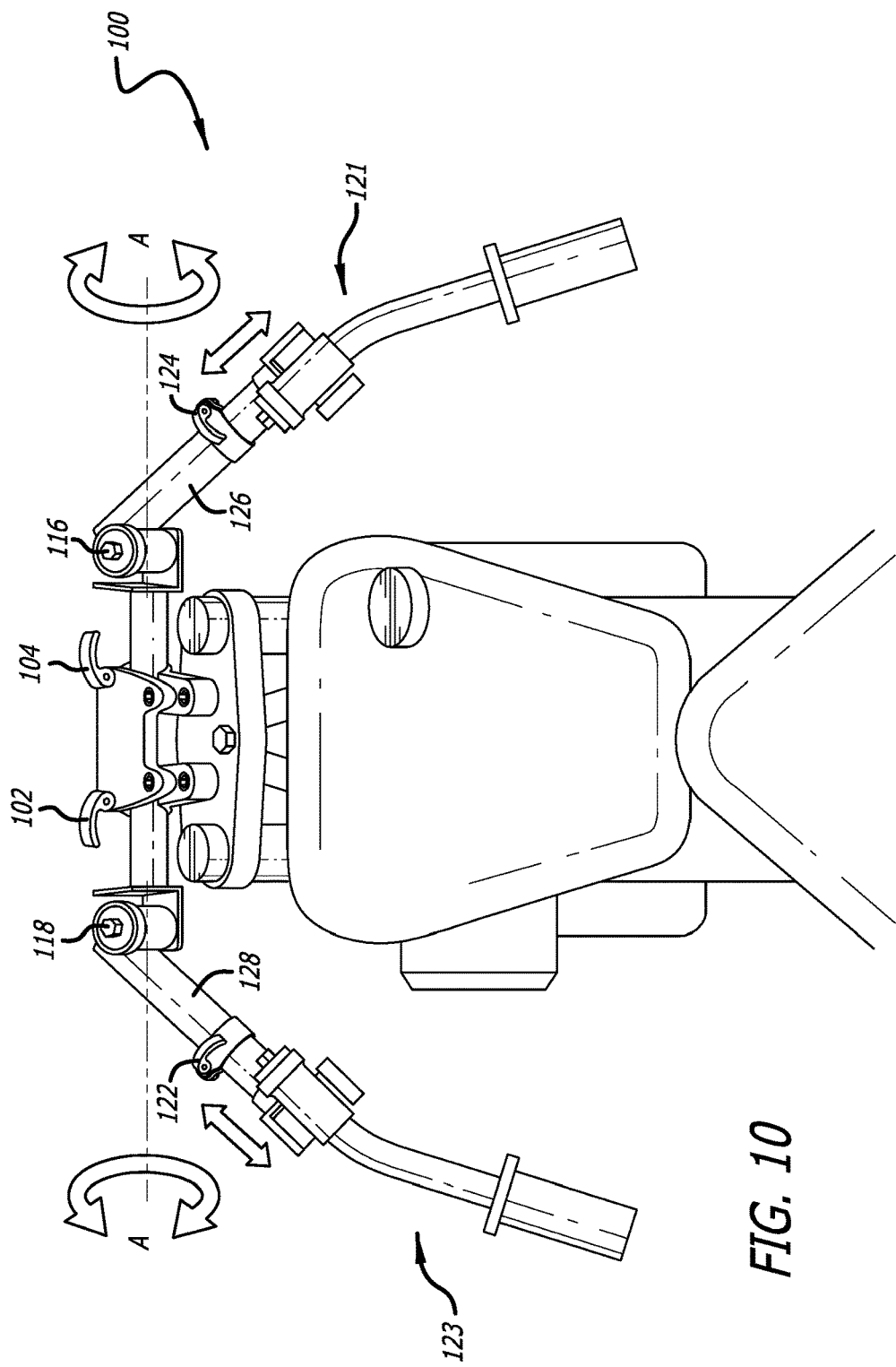
FIG. 10 is top view from a user perspective of an alternative embodiment of the manually reconfigurable handlebar assembly of FIG. 1 in which the motor of FIG. 1 is eliminated and quick release clamps are used in place of some of the pull and twist or push and twist joints utilized in the embodiment of FIG. 1.

FIG. 10 is top view from a user perspective of an alternative embodiment of the manually reconfigurable handlebar assembly of FIG. 1 in which the motor of FIG. 1 is eliminated and quick release clamps are used in place of some of the pull and twist or push and twist joints utilized in the embodiment of FIG. 1. In this embodiment, first and second quick release clamps 102 and 104 control angular orientation of first and second handlebar assemblies 121 and 123 about the A-A axis. Pull and twist or push and twist joints 116 and 118 enable control of orientation about the $B_1$ and $B_2$ axes as per the operation of joints 16 and 18 with respect to the embodiment of FIG. 1 above. The length of first and second risers 126 and 128 is adjusted manually and then locked in place via the opening and closure of third and fourth quick release clamps 122 and 124 in lieu of worm gears 22 and 24 respectively in the embodiment of FIG. 1. In all other aspects, the embodiment of FIG. 10 is similar to that of FIG. 1.

Manually actuated quick release clamps are well-known in the art. See for example U.S. Pat. No. 5,409,321 entitled QUICK RELEASE CLAMP FOR A BICYCLE issued Apr. 25, 1995 to C. F. Chen, the teachings of which are hereby incorporated by reference herein.

Thus, the present invention has been described herein with reference to a particular embodiment for a particular application. Those having ordinary skill in the art and access to the present teachings will recognize additional modifications, applications and embodiments within the scope thereof. For example, the present invention is not limited to use on motorcycles. The invention may be used on any vehicle having a steering mechanism. Further, the present invention is not limited to the use of the clamps shown herein. Any mechanism that can be actuated, preferably by hand, and yet provide a secure holding position when closed, may be used without departing from the scope of the present teachings. Those of ordinary skill in the art will appreciate that with the present teachings, other combinations of pull and twist, push and twist, worm gears, drive motors and quick release clamps may be implemented to suit a particular application without departing from the scope of the present teachings. And the pull and twist and push and twist joints disclose herein may be used on other structures other than motorcycles, bicycles, snow mobiles and/or other vehicles for which quick and easy reconfiguration with secure anchoring is desired.

It is therefore intended by the appended claims to cover any and all such applications, modifications and embodiments within the scope of the present invention.

Accordingly,

What is claimed is:

1. A mechanism for securing a payload in a desired angular orientation comprising:
   a gear;
   a shaft coaxially mounted to engage the gear in a first position on a longitudinal axis of the shaft and to disengage the gear in a second position of the longitudinal axis of the shaft, said gear or said shaft being coupled to said payload whereby the angular orientation of said payload may be changed from a first angle to a second angle when said gear is in said second position; and
   a spring assembly mechanically coupled to the gear and shaft to restore the shaft to the first position from the second position.

2. The invention of claim 1 wherein said gear and said shaft have matching and interlocking splines.

3. The invention of claim 2 wherein said gear has male splines and said shaft has female splines that match and interlock with said male splines.

4. The invention of claim 2 wherein said gear has female splines and said shaft has male splines that match and interlock with said female splines.

5. The invention of claim 1 wherein said shaft is capped at a proximal end thereof, said cap being substantially transverse to the longitudinal axis of said shaft and having an aperture therein at the center thereof.

6. The invention of claim 5 wherein said spring assembly includes a bolt mounted for reciprocal movement in said shaft along the longitudinal axis thereof, said bolt having a bolt head at a distal end thereof and being secured to said gear at a proximal end of said bolt.

7. The invention of claim 6 wherein said spring assembly further includes a spring mounted between said bolt head and said cap.

8. An adjustable handlebar assembly comprising:
   a first mechanism for effecting rotation of a first handlebar assembly and a second handlebar assembly about a first axis;
   a second mechanism and a third mechanism for effecting translation of said first and second handlebar assemblies along a second axis and a third axis respectively;
   a fourth mechanism and a fifth mechanism for selecting an angular orientation of said first and second handlebar assemblies relative to said first axis and locking said handlebar assemblies in a selected angular orientation, said fourth and fifth mechanisms each including:
      a gear;
      a shaft coaxially mounted to engage the gear in a first position on a longitudinal axis of the shaft and to disengage the gear in a second position of the longitudinal axis of the shaft, said gear or said shaft being coupled to a payload whereby an angular orientation of said payload may be changed from a first angle to a second angle when said gear is in said second position; and
      a spring assembly mechanically coupled to the gear and shaft to restore the shaft to the first position from the second position.

9. The invention of claim 8 wherein said first mechanism is a motor.

10. The invention of claim 9 wherein said second and third mechanisms include a first worm gear and a second worm gear respectively.

11. The invention of claim 10 further including a first bar angle control mechanism and second bar angle control mechanism between said motor and said first worm gear and said second worm gear respectively.

12. The invention of claim 11 wherein, said first bar angle control mechanism and said second bar angle control mechanism each include:
   a gear;
   a shaft coaxially mounted to engage the gear in a first position on a longitudinal axis of the shaft and to disengage the gear in a second position of the longitudinal axis of the shaft, said gear or said shaft being coupled to said payload whereby an angular orientation of said payload may be changed from a first angle to a second angle when said gear is in said second position; and
   a spring assembly mechanically coupled to the gear and shaft to restore the shaft to the first position from the second position.

13. The invention of claim 12 wherein said handlebar assembly includes a first handle and a second handle coupled to said second and third mechanisms respectively, each of said second and third mechanisms including a first handle angle control mechanism coupled to said handle, said first handle angle control mechanism including:
- a gear;
- a shaft coaxially mounted to engage the gear in a first position on a longitudinal axis of the shaft and to disengage the gear in a second position of the longitudinal axis of the shaft, said gear or said shaft being coupled to said payload whereby an angular orientation of said payload may be changed from a first angle to a second angle when said gear is in said second position; and
- a spring assembly mechanically coupled to the gear and shaft to restore the shaft to the first position from the second position.

14. The invention of claim 13 wherein each of said second and third mechanisms further include a second handle angle control mechanism coupled to said handle, said second handle angle control mechanism including:
- a gear;
- a shaft coaxially mounted to engage the gear in a first position on a longitudinal axis of the shaft and to disengage the gear in a second position of the longitudinal axis of the shaft, said gear or said shaft being coupled to said payload whereby an angular orientation of said payload may be changed from a first angle to a second angle when said gear is in said second position; and
- a spring assembly mechanically coupled to the gear and shaft to restore the shaft to the first position from the second position.

\* \* \* \* \*